United States Patent
Paganelli

(10) Patent No.: US 11,177,488 B2
(45) Date of Patent: Nov. 16, 2021

(54) SYSTEM COMPRISING A FUEL-CELL STACK, AND ASSOCIATED CONTROL METHOD

(71) Applicant: Compagnie Generale des Etablissements Michelin, Clermont-Ferrand (FR)

(72) Inventor: Gino Paganelli, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 9 days.

(21) Appl. No.: 16/470,810

(22) PCT Filed: Dec. 8, 2017

(86) PCT No.: PCT/FR2017/053470
§ 371 (c)(1),
(2) Date: Jun. 18, 2019

(87) PCT Pub. No.: WO2018/115630
PCT Pub. Date: Jun. 28, 2018

(65) Prior Publication Data
US 2019/0312289 A1 Oct. 10, 2019

(30) Foreign Application Priority Data
Dec. 20, 2016 (FR) ...................................... 1662832

(51) Int. Cl.
*H01M 8/04* (2016.01)
*H01M 8/04089* (2016.01)
(Continued)

(52) U.S. Cl.
CPC ... *H01M 8/04097* (2013.01); *H01M 8/04179* (2013.01); *H01M 8/04231* (2013.01); *H01M 8/04425* (2013.01); *H01M 8/1018* (2013.01)

(58) Field of Classification Search
CPC ......... H01M 8/04097; H01M 8/04231; H01M 8/04425; H01M 8/04179
See application file for complete search history.

(56) References Cited

U.S. PATENT DOCUMENTS

| 3,716,415 A | 2/1973 | Gagnon et al. |
| 10,566,635 B2 * | 2/2020 | Metkemeijer ..... H01M 8/04231 |

(Continued)

FOREIGN PATENT DOCUMENTS

| EP | 1 018 774 A1 | 7/2000 |
| WO | 2015/118161 A1 | 8/2015 |

OTHER PUBLICATIONS

Translation of written opinion (no date).*
(Continued)

*Primary Examiner* — Amanda C. Walke
(74) *Attorney, Agent, or Firm* — Venable LLP

(57) ABSTRACT

A fuel cell system comprises a stack of electrochemical cells forming a fuel cell with an ion-exchange polymer membrane and a fuel gas supply circuit connecting a fuel gas reservoir to the anode of the fuel cell, the system being characterized in that it comprises: a hydrogen purge valve (305) installed on the anode outlet of the stack, a receiver (310) of the purged hydrogen, and means for redirecting the purged hydrogen to the anode inlet of the fuel cell. There is also an associated control method.

10 Claims, 2 Drawing Sheets

(51) Int. Cl.
*H01M 8/04119* (2016.01)
*H01M 8/04223* (2016.01)
*H01M 8/0438* (2016.01)
*H01M 8/1018* (2016.01)

(56) References Cited

U.S. PATENT DOCUMENTS

| | | |
|---|---|---|
| 2008/0160363 A1 | 7/2008 | Tsukada |
| 2014/0093797 A1* | 4/2014 | Muetschele ........ B01D 19/0063 |
| | | 429/415 |
| 2014/0212777 A1* | 7/2014 | Hofer ................ H01M 8/04753 |
| | | 429/415 |
| 2016/0204454 A1* | 7/2016 | Hakala ................ H01M 8/0618 |
| | | 429/415 |
| 2017/0012306 A1 | 1/2017 | Metkemeijer et al. |

OTHER PUBLICATIONS

Machine translation of EP 1018774 (no date).*
International Search Report dated Mar. 9, 2018, in corresponding PCT/FR2017/053470 (6 pages).

* cited by examiner

SYSTEM COMPRISING A FUEL-CELL STACK, AND ASSOCIATED CONTROL METHOD

FIELD OF THE INVENTION

The present invention relates to fuel cells, notably fuel cells supplied with hydrogen.

A fuel cell allows direct production of electrical energy by an electrochemical reaction, without passing through conversion to mechanical energy.

A fuel cell generally comprises a combination in series of unit elements, each consisting essentially of an anode and a cathode separated by a polymer membrane allowing passage of ions from the anode to the cathode. This combination is also called a stack, and generally comprises circuits for supplying gas, allowing the cell to function. The anode, supplied with fuel, for example hydrogen, is the site of an oxidation half-reaction $H_2$ (g)=2 $H^+$ (aq)+2 $e^-$. At the same time the cathode, supplied with a supporter of combustion, for example pure oxygen or the oxygen contained in air, is the site of a reduction half-reaction: $O_2$ (g)+4 $H^+$ (aq)+4 $e^-$=2 $H_2O$ (I)

It was found that during the operating phases of the fuel cell, water could accumulate at the anode, and this water must be removed to ensure proper operation of the cell. Thus, a person skilled in the art is familiar with supplying the fuel cell by creating a hydrogen over-stoichiometry, which makes it possible to remove not only the water, but also gaseous impurities contained in the hydrogen, or that have migrated from the cathode.

In stoichiometric operation, the amount of hydrogen supplied to the fuel cell is approximately equal to the amount consumed by the cell. In this case, the velocity of the gas at the outlet of the internal channels for hydrogen feed will be zero, giving free rein to the accumulation of gaseous or liquid impurities and in particular water migrating naturally to the anode by back-diffusion from the cathode. Conversely, over-stoichiometric supply signifies that the fuel cell is supplied with more hydrogen than is required for the electrochemical reaction to take place. As is known, stoichiometry of between 1.1 and 2 may be applied.

PRIOR ART

Various solutions are known in the prior art for meeting this need for hydrogen over-stoichiometry. Thus, in a first solution shown in FIG. 1, pressurized hydrogen, for example at 10 bar, is present at the hydrogen supply tube 101. A pressure-regulating solenoid valve 102 associated with a pressure sensor 103 makes it possible to control the hydrogen pressure at the fuel cell inlet 104. A purge valve 105 on the anode outlet of the fuel cell is opened periodically to produce hydrogen over-stoichiometry. The hydrogen purged escapes to the surroundings at the outlet 106. This solution gives particularly efficient removal of the water at the anode, because when the purge valve is opened a very large flow of hydrogen escapes from the cell.

However, hydrogen purge to the surrounding air proves to be rather unsatisfactory for several reasons:
  The hydrogen purged is lost, which leads to a loss of efficiency and therefore of performance of the fuel cell,
  Furthermore, loss of hydrogen decreases the autonomy of vehicles equipped with a fuel cell employing a system of this kind, which compromises its use with fuel cells of several kilowatts. In fact, with this solution, all of the over-stoichiometric hydrogen is lost, which may represent between 10% and 100% of the hydrogen consumed for stoichiometries ranging from 1.1 to 2,
  Furthermore, a large purge of hydrogen into the surrounding air seems unsatisfactory in terms of safety, and it is known that regulations with regard to escape of hydrogen into the atmosphere are to be made stricter in the future.

Another solution known from the prior art, shown in FIG. 2, consists of recirculating the hydrogen from the anode outlet to the anode inlet as indicated by the arrow 209. For this purpose, for example a Venturi ejector 207 is used, in conjunction with a non-return valve 208. A water separator 210 is normally placed on the recirculating loop for trapping liquid water. Recirculation makes it possible to reach a hydrogen stoichiometry of the order of 2 without any loss of hydrogen, and therefore allows a sufficient gas velocity to be reached to prevent accumulation of water in the internal channels of the fuel cell. However, this solution requires the installation of a purge valve 205 at the outlet of the water separator and periodical opening thereof to remove the residues of water at the anode and the impurities and in particular nitrogen, which tend to accumulate at the anode. The frequency of the purges is rather dominated by the need to generate sudden discharges of hydrogen periodically to remove the residues of water at the anode, and it is difficult in practice to get down to hydrogen losses below 3%. Consequently, this solution does not prove satisfactory with respect to losses of hydrogen, which are found to be too high.

The present invention aims to supply a solution for ensuring a high enough hydrogen stoichiometry, without encountering the aforementioned drawbacks of the prior art.

BRIEF DESCRIPTION OF THE INVENTION

Thus, the invention relates to a fuel cell system comprising a stack of electrochemical cells forming a fuel cell with an ion-exchange polymer membrane and a fuel gas supply circuit connecting a fuel gas reservoir to the anode of the fuel cell, the system being characterized in that it comprises:
  a hydrogen purge valve installed on the anode outlet of the stack,
  a receiver for the purged hydrogen, and
  means for redirecting the purged hydrogen to the anode inlet of the fuel cell.

A system of this kind makes it possible to perform numerous purges of hydrogen without creating safety problems, since the purged hydrogen is not released into the atmosphere, but is redirected to the fuel cell inlet. For this purpose, the invention also relates to a fuel cell control method, which will be described later.

Furthermore, in order to offer a system with enhanced efficiency, in one embodiment the means for redirecting the purged hydrogen comprise an ejector of the Venturi type.

The Venturi ejector is advantageous in that it is selective, i.e. it recirculates hydrogen preferentially rather than the impure gases, which have a higher density. Thus, the nitrogen from the anode outlet of the cell is not redirected to the anode inlet of the cell but remains trapped in the receiver.

Another advantage of the Venturi ejector is that, owing to its operating principle which tends to generate a vacuum, pressures below atmospheric pressure are reached in the receiver. The negative pressure thus created makes the subsequent hydrogen purge particularly effective owing to the gas velocity generated by the pressure difference. The invention therefore allows effective removal of water from the anode channels without generating hydrogen losses.

As a reminder, the presence of residual water in the anode channels leads to a gradual deterioration of the performance of the fuel cell, since accumulation of water leads to flooding of the active surface of the cell, which can no longer fulfil its role.

As mentioned above, as the Venturi ejector is selective, the impure gases such as nitrogen are not redirected to the fuel cell inlet. It is therefore useful, in a particular embodiment of the invention, to provide means for evacuating this nitrogen.

Thus, in one embodiment example, a fuel cell system according to the invention further comprises a pressure measuring sensor in the hydrogen receiver and means for purging the hydrogen receiver, when the pressure in the receiver is above atmospheric pressure.

The means for purging the hydrogen receiver comprise a valve, for example. This valve is only opened when the pressure in the receiver is above atmospheric pressure, to prevent ambient air entering the receiver during valve opening. This valve also serves for purging the water present in the hydrogen receiver, which also acts as a water separator.

As mentioned above, the invention also relates to a method of controlling a fuel cell system, comprising the following steps:
- a step of supplying hydrogen to the anode part of the fuel cell,
- a step of purging the residual hydrogen at the anode outlet of the fuel cell towards a receiver, and
- a step of redirecting the purged hydrogen from the receiver to the anode inlet of the fuel cell.

These steps are to be carried out as many times as necessary. In fact, since hydrogen is not lost, as it is redirected to the system, no hydrogen losses are suffered, and the purge cycle may therefore be carried out several times.

In contrast to one of the solutions of the prior art, where hydrogen was purged directly to the surrounding air, here the purge is directed to a receiver, which has a pressure below atmospheric pressure. There is thus a large pressure difference between the outlet of the anode circuit and the receiver, which makes the successive purges, commonly called "pressure surges", more effective.

In a particular embodiment of the invention, the step of purging the residual hydrogen corresponds to a step of opening a valve installed on the anode outlet of the fuel cell. The duration of the purge then corresponds to a valve opening time, which must be determined so as to displace the whole of the anode volume.

In another embodiment, the invention further comprises a step of purging the receiver to atmosphere. This step is advantageously carried out when the pressure in the receiver is above atmospheric pressure, for reasons explained above.

BRIEF DESCRIPTION OF THE FIGURES

Other aims and advantages of the invention will become clear from the following description of a preferred but non-limiting embodiment, illustrated by the following figures in which.

DETAILED DESCRIPTION

Figure 1:
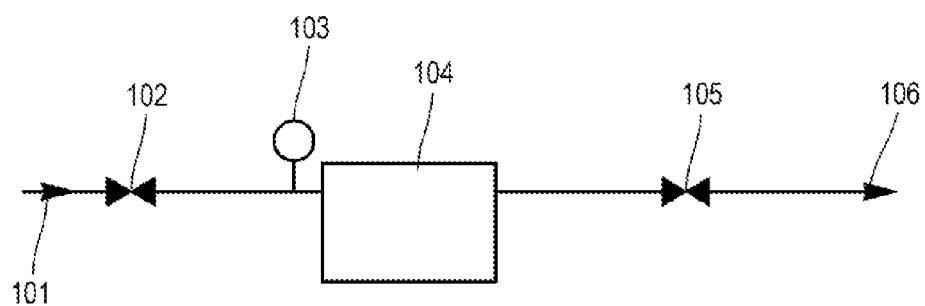
FIGS. 1 and 2, already described, show systems of the prior art.
Figure 2:
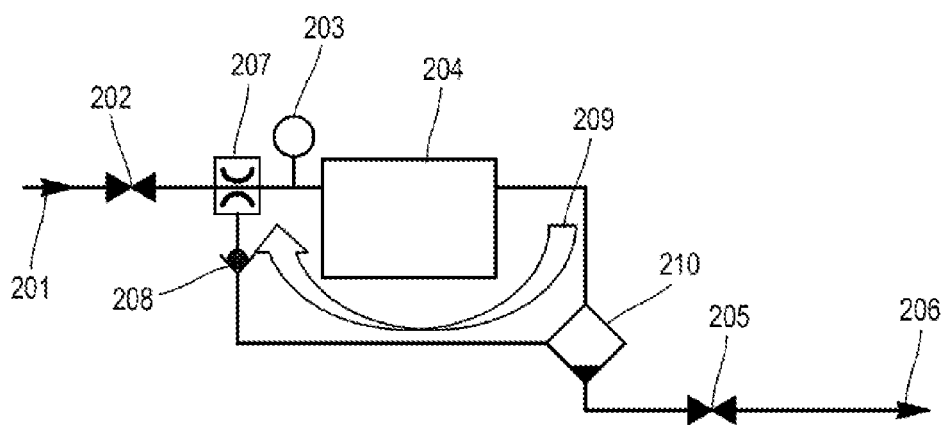
Figure 3:
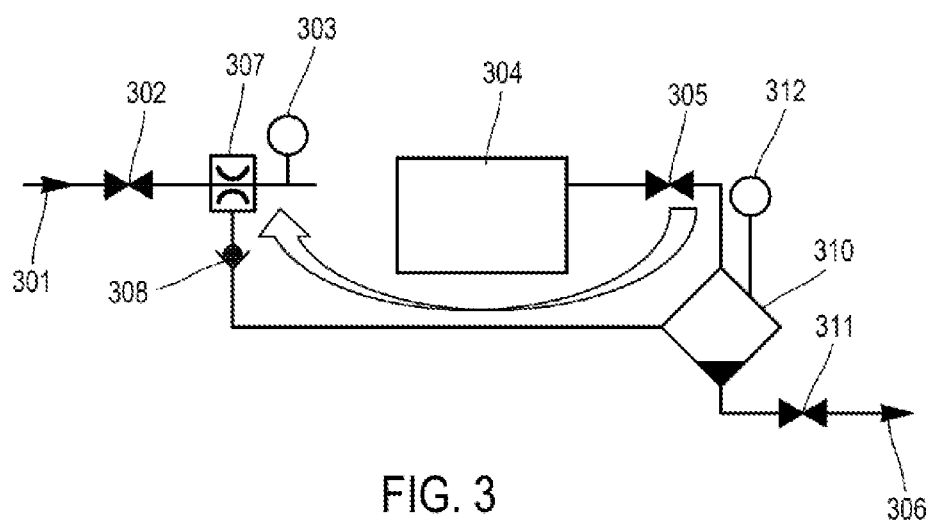
FIG. 3 shows a system according to the invention.

Thus, FIG. 3 shows a fuel cell system in which pressurized hydrogen is present at the level of the hydrogen supply tube 301. A pressure-regulating solenoid valve 302 associated with a pressure sensor 303 makes it possible to control the hydrogen pressure at the fuel cell inlet 304. A purge valve 305 is placed at the anode outlet. The hydrogen purged on opening the valve 305 is directed to a receiver 310. A Venturi ejector 307 associated with a non-return valve 308 is installed in such a way that it is able to aspirate the hydrogen contained in the receiver 310 and redirect it to the inlet of the anode chamber of the fuel cell.

The receiver 310 also acts as a water separator. A receiver purge valve 311, installed at the outlet of the receiver 310, allows the elements that are not redirected to the fuel cell inlet to be purged to the exterior, namely:
- water separated in the receiver 310, which came from the anode channels, and
- nitrogen or other impure gases present in the receiver 310 and which preferably are not recirculated by the Venturi ejector 307.

This system therefore advantageously allows effective removal of water from the anode channels without generating hydrogen losses, and without any risk of contaminating the fuel cell by reinjection of nitrogen or other impure gas.

Figure 4:
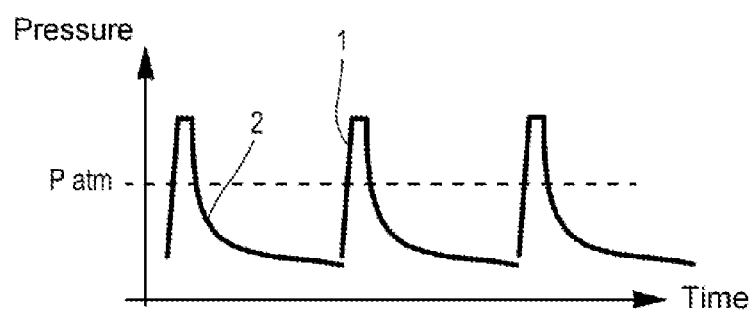
FIG. 4 is a graph showing the variation of pressure in the receiver of a system according to the invention.

We shall now describe the control of a system of this kind, additionally on the basis of FIG. 4, which shows the pressure variation inside the receiver 310, measured by the sensor 312.

In a first phase 1, the pressure is observed to increase. This phase corresponds to opening of the purge valve 305, which leads to purging of the residual hydrogen from the anode outlet of the cell to the receiver 310. The duration of this first phase, which corresponds to the valve opening time, must be sufficient to ensure sufficient over-stoichiometry within the fuel cell for example for between 0.5 and 10 seconds. Furthermore, prolonging the opening of the purge valve 305 would not lead to loss of hydrogen since it would be recirculated by the ejector. However, keeping it open for too long will be avoided, to allow sufficient periodicity of the purges, for example between 2 and 10 times per minute.

Once valve 305 is closed, we then enter phase 2, during which the Venturi ejector evacuates the receiver 310 by aspiration of the hydrogen, redirecting it to the inlet of the cell. The duration of the second phase must be sufficient to reach a sufficient negative pressure within the receiver 310 but must not be too long, so as to allow a sufficient periodicity of the purges. For example, the duration of phase 2 may be set at between 2 and 10 seconds. The receiver 310 also acts as a water separator and it is necessary to evacuate this water to the surroundings 306 by means of a receiver purge valve 311. This valve may be operated periodically. However, as mentioned above, valve 311 is only opened when the pressure in the receiver indicated by the pressure sensor 312 is above atmospheric pressure.

In another embodiment example, not illustrated in the figures, valve 311 may be replaced with a calibrated orifice for generating a controlled exhaust, combined with a non-return valve to prevent reintroduction of ambient air into the receiver 310.

Furthermore, as noted above, the Venturi ejector is naturally selective, i.e. the cross-section of the recirculation orifice is calibrated for hydrogen. The presence of a gas with higher density mixed with the hydrogen, such as nitrogen for example, will cause saturation of the Venturi effect and the receiver 310 will no longer be able to reach the same level of vacuum.

Thus, if it is detected, during phase 2, that the pressure in the receiver 310 no longer goes below a certain predetermined level, this signifies that an excessive amount of nitrogen has accumulated in the receiver. In one example, opening of the valve 311 is then operated, to remove the nitrogen while minimizing losses of hydrogen. This makes it possible to minimize the loss of hydrogen to values below 1%.

The invention claimed is:

1. A fuel cell system comprising a stack of electrochemical cells forming a fuel cell with an ion-exchange polymer membrane and a fuel gas supply circuit connecting a fuel gas reservoir to an anode of the fuel cell, the system further comprising:
a hydrogen purge valve installed on an anode outlet of the stack;
a receiver of purged hydrogen, wherein residual hydrogen is purged upon opening the hydrogen purge valve and directed to the receiver; and
means for depressurizing the receiver by redirecting the purged hydrogen to the anode inlet of the fuel cell, wherein the means comprises an ejector of a Venturi type, wherein a cross-section of a recirculation orifice of the ejector is calibrated for hydrogen.

2. The fuel cell system according to claim 1 further comprising a pressure measuring sensor in the hydrogen receiver.

3. The fuel cell system according to claim 1 further comprising purging means of the hydrogen receiver for when the pressure in the receiver is above atmospheric pressure.

4. A method of controlling the fuel cell system according to claim 1 comprising the following steps:
supplying hydrogen to the anode of the fuel cell;
purging the residual hydrogen at the anode outlet of the fuel cell toward the receiver; and
depressurizing the receiver by selectively redirecting the purged hydrogen from the receiver to the anode inlet of the fuel cell by utilizing the ejector of the Venturi type, wherein the steps of purging the residual hydrogen and of depressurizing the receiver are alternated.

5. The method according to claim 4, wherein the step of purging the residual hydrogen corresponds to a step of opening the hydrogen purge valve installed on the anode outlet of the fuel cell and is started when pressure in the receiver is below atmospheric pressure.

6. The method according to claim 4, further comprising a step of purging water and gases from the receiver to atmosphere, wherein the gases include nitrogen.

7. The method according to claim 6, wherein the step of purging the water and the gases from the receiver is carried out when the pressure in the receiver is above atmospheric pressure.

8. The method according to claim 4, wherein the step of purging the residual hydrogen is stopped by closing the hydrogen purge valve when pressure in the receiver is above atmospheric pressure.

9. The method according to claim 4, further comprising a step of purging nitrogen from the receiver to atmosphere.

10. The method according to claim 9, wherein the step of purging the nitrogen from the receiver is carried out when the pressure in the receiver is no longer below a predetermined level.

* * * * *